United States Patent [19]
Statler

[11] Patent Number: 5,784,875
[45] Date of Patent: Jul. 28, 1998

[54] WATER INJECTION INTO A GAS TURBINE USING PURGE AIR

[75] Inventor: William O. Statler, Scotia, N.Y.

[73] Assignee: Innovative Control Systems, Inc., Clifton Park, N.Y.

[21] Appl. No.: 562,857

[22] Filed: Nov. 27, 1995

[51] Int. Cl.$^6$ ............................................. F02C 3/30
[52] U.S. Cl. ................. 60/39.05; 60/39.463; 60/39.55
[58] Field of Search ..................... 60/39.05, 39.3, 60/39.463, 39.53, 39.55

[56] References Cited

U.S. PATENT DOCUMENTS

| | | |
|---|---|---|
| 4,259,837 | 4/1981 | Russell et al. |
| 4,327,547 | 5/1982 | Hughes et al. ................. 60/39.463 |
| 4,977,740 | 12/1990 | Madden et al. |
| 5,228,283 | 7/1993 | Sciocchetti |
| 5,274,995 | 1/1994 | Homer et al. |
| 5,317,861 | 6/1994 | Fox ................................. 60/39.05 |
| 5,423,173 | 6/1995 | Lemmon et al. ............... 60/39.463 |

*Primary Examiner*—Louis J. Casaregola
*Attorney, Agent, or Firm*—George Jones

[57] ABSTRACT

An apparatus and method are provided for the reduction of NOX emissions and the augmentation of output from a dual fueled (gas/oil) turbine such as an electrical power generating turbine. The invention involves using pathways already existing in a turbine for injecting air into a combustion chamber for transporting water into the combustion chamber, especially when fueled with oil. Ideally only minimal modifications to the turbine are necessary, but generally the invention decreases the time and expense for modifying an existing turbine to include water injection capabilities to increase output or decrease NOX emission.

6 Claims, 4 Drawing Sheets

1

WATER INJECTION INTO A GAS TURBINE USING PURGE AIR

FIELD OF THE INVENTION

This invention relates to a combustion turbine commonly called a gas turbine. More specifically the invention relates to the injection of water into the combustion zone of the gas turbine for the purpose of reducing the formation of nitrogen oxide, commonly called NOX, and/or the purpose of increasing the power output of the gas turbine. Even more specifically the present invention relates to a purge air flow and control system to carry the water into the combustion zone through the gas fuel nozzles when the turbine is being fueled by an oil fuel.

BACKGROUND OF THE INVENTION

The combustion of any fuel in air creates a pollutant generally referred to as NOX. NOX is a significant component of air pollution affecting densely populated urban areas as well as other areas particularly susceptible to air pollution. NOX is formed in the combustion process when some of the nitrogen present in air is oxidized to form nitrogen oxides.

NOX production can therefore be reduced by limiting the oxidation of nitrogen. Nitrogen oxidation can be reduced by at least these two methods: 1) reducing the time that nitrogen is exposed to the high temperature, and 2) lowering the temperature that the nitrogen is exposed to within the combustion zone. Injecting water into a combustion chamber has been found to reduce both the maximum temperature and the duration of exposure of nitrogen to the high temperatures.

Water injection has also been found useful for increasing power output from a gas turbine. U.S. Pat. No. 2,847,825 is an example of such a use for temporary thrust augmentation of an aircraft engine.

Water injection systems are one of the power generating industry's answers to federal and state regulations limiting NOX emissions. U.S. Pat. Nos. 4,600,151, 4,519,769, 4,342, 198, 4,337,618, 4,290,558, 4,259,837, 4,160,362 and 4,110, 973 describe the injection of water for the purpose of reducing NOX emissions. A control system for such injection schemes is described in U.S. Pat. No. 4,259,837. The manufacturers of gas turbines have incorporated water injection systems in their recent designs to help meet the NOX emission limits.

Several recent methods of injecting water have been developed. For example U.S. Pat. No. 4,977,740, issued to Madden et al., describes a fuel injector for gaseous and oil fuels which includes two radially spaced passages for air, an oil fuel passage disposed between the air passages, the fuel passage discharging water mixed with fuel, and a gaseous fuel passage discharging gaseous fuel mixed with steam.

Another method of water injection is described in U.S. Pat. No. 5,274,995, issued to Horner et al. This invention provides water through a nozzle conduit in the fuel nozzle. The resultant film of water at the downstream end of the venturi is atomized by a high velocity air jet.

Yet another exemplary injection scheme is described in U.S. Pat. No. 5,228,282 issued to Sciocchetti. A fuel nozzle cartridge is provided for insertion into a central distillate fuel passage of the fuel nozzle body. Two separate and concentric passageways allow injection of water into the combustor as a finely atomized spray inside a larger conical fuel spray.

These inventions have in common new designs for addition of water to the combustion zone.

Water injection is particularly useful to the electric utility industry where gas turbines are generally used for "peaking service." Gas turbine generation systems are usually turned on during peak demand periods. During these periods it is advantageous to the utility to maximize the output of each generator and in this maximization capacity, the power augmentation aspects of water injection are beneficial. Output from existing generating equipment can be increased by adding water injection sometimes even at great expense but thereby sparing the cost of new generation facilities possibly required to meet capacity needs or to comply with pollution standards.

The components necessary for water injection capabilities in a gas turbine generator include: a source of purified, demineralized water, a pump to deliver the water, control and stop valves, a control system, and a means for injecting the water into the turbine combustion zone.

The present invention provides an alternative to new turbine designs, used for example to convert fuels to electricity or other forms of energy, by providing means for injection of water into turbines of older design. A number of older facilities can hereby be modified at low cost to increase power output and reduce NOX emissions by the injection of water through existing turbine architecture. Provision of this water injection means makes the retention in service of older turbine facilities more ecologically responsible and more economically affordable.

For example, previous to the present invention, a likely retrofitting program for providing water injection to a dual fuel turbine, for example, a General Electric dual fuel gas turbine included the replacement of the existing fuel nozzle assemblies. For example a new nozzle assembly such as described in U.S. Pat. No. 5,228,282 was installed in place of an existing, still functional nozzle assembly. This replacement involved considerable direct cost for the replacement of the hardware as well as considerable cost in downtime of the generating capacity. A simpler, less time consuming and less expensive retrofitting hardware and process for water injection into turbines of older design will spare a significant portion of these costs.

SUMMARY OF THE INVENTION

It is an object of this invention to provide a means for using existing or modified architecture of a dual fuel gas turbine to inject water into the combustion zone for power augmentation and NOX emission reduction.

It is a further aspect of this invention to accomplish said water injection at a significant cost savings compared to replacing the existing fuel nozzle assemblies.

It is another object of this invention to use an existing or added purge air system installed in the turbine architecture to carry water droplets into the combustion zone to effect NOX emission reduction and power increase.

Other objects, advantages and salient features of the invention will become apparent from the following detailed description, which taken in conjunction with the annexed drawings, disclose preferred embodiments of the invention.

DETAILED DESCRIPTION OF THE INVENTION

Figure 1:
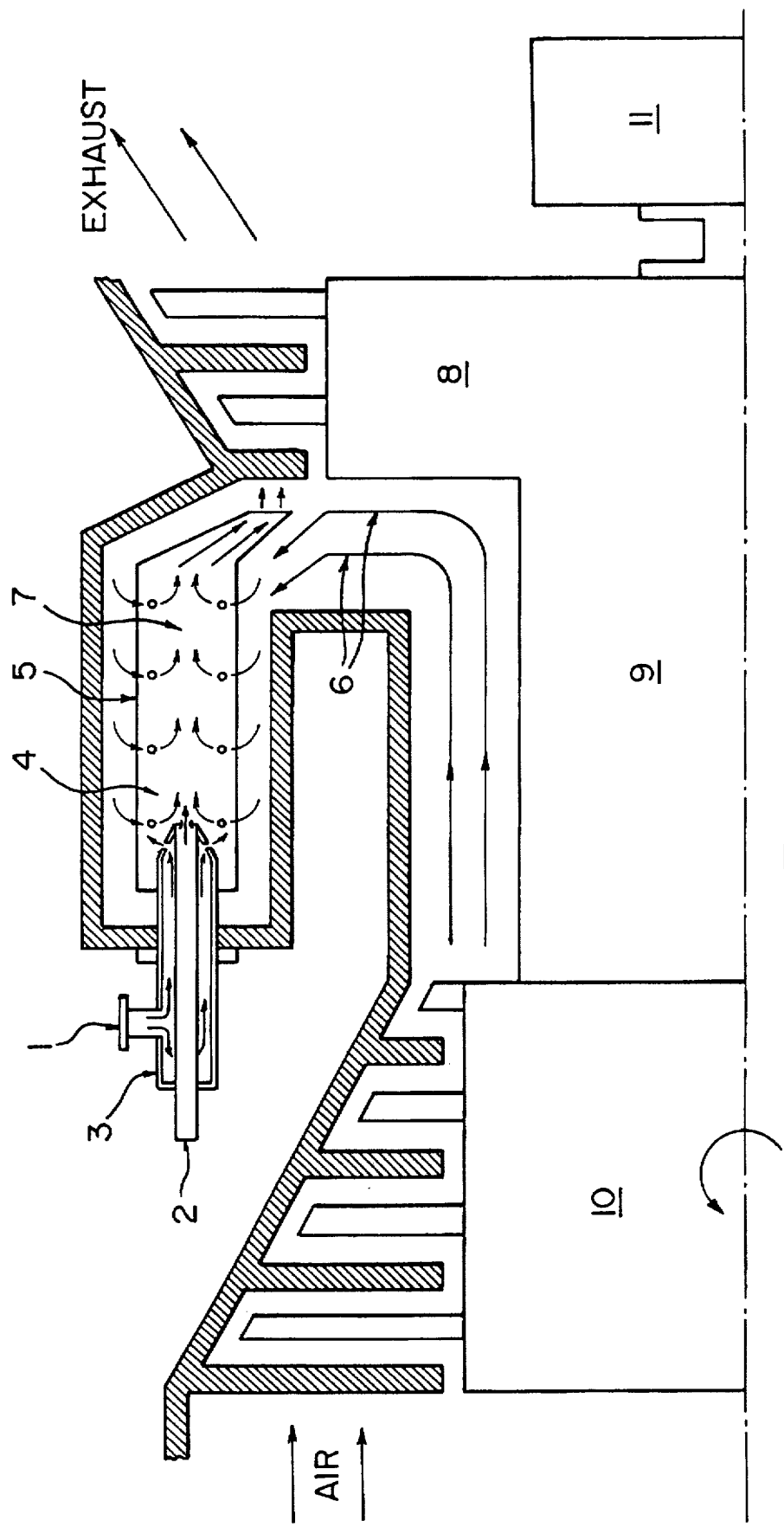
FIG. 1 schematically depicts a gas turbine generally found in Prior Art.

A turbine based generating system is shown in FIG. 1. Gas fuel 1 and/or oil fuel 2 are delivered via a fuel nozzle assembly 3 to the combustion zone 4 encased by a liner 5. (Most designs incorporate multiple combustion zones arranged in a circular manner around the turbine center line.) Compressor air 6 is added and heated as the combustion products proceed through the dilution zone 7. The heated air then drives a turbine 8 which operates a rotor 9, which turns the gas turbine's main air compressor 10 and an electric generator 11 or other load.

Figure 2:
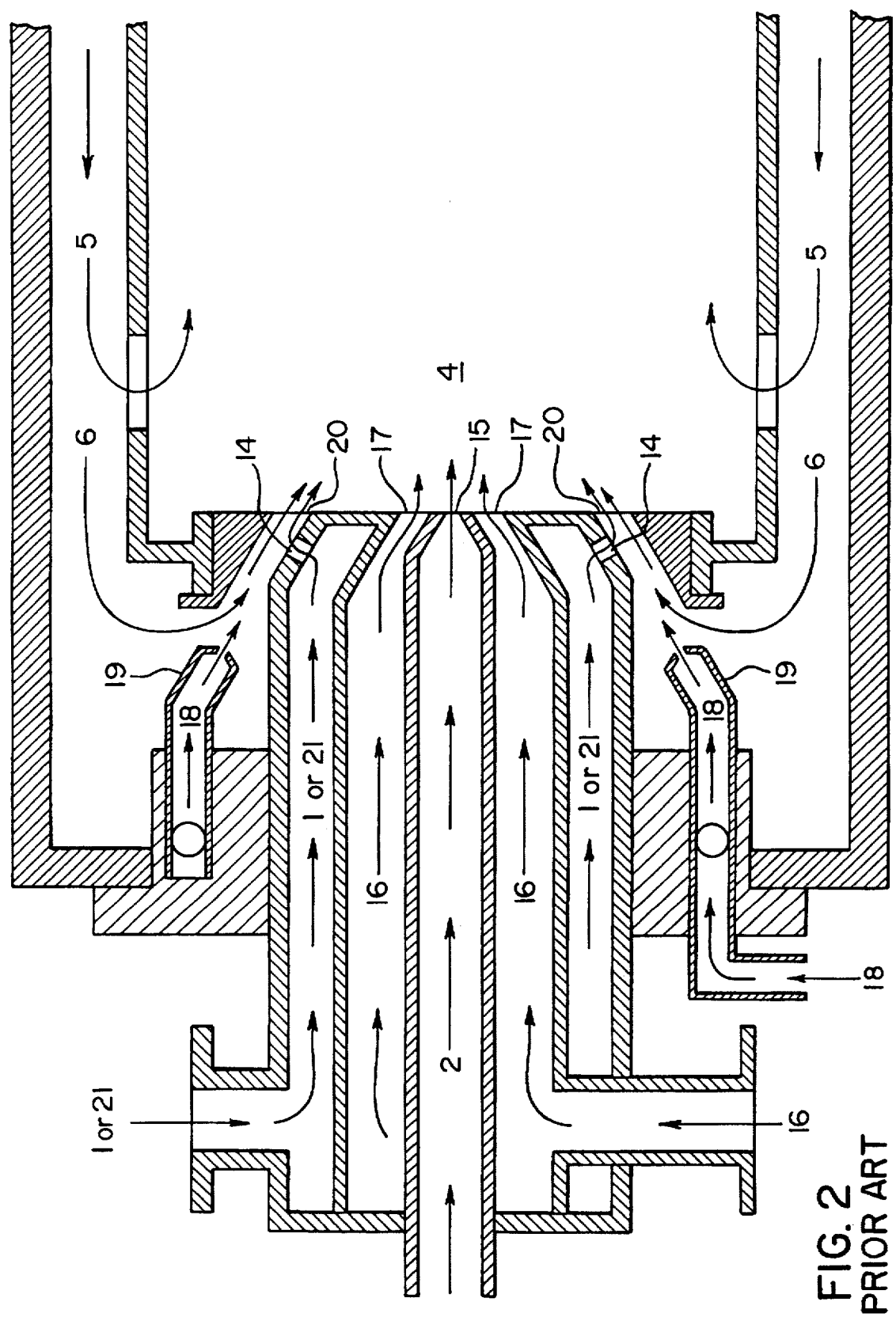
FIG. 2 is a detailed view of area where fuel, air and water are mixed for combustion.

Details of a typical combustion area are shown in FIG. 2. Gas fuel 1 or oil fuel 2 are delivered to the combustion zone 4 by a set of gas nozzles 14 and an oil nozzle 15. A flow of atomizing air 16 is provided through a set of intermediate concentric atomizing air nozzles 17 to enhance the combustion of the oil fuel 2. Water 18, is injected through water nozzles 19, and mixed with compressor air 6 and carried past the gas nozzles 14. Water 18, gas fuel 1 and compressor air 6 then enter the combustion zone 4 through annular passage 20. On certain existing dual fuel designs a purge air flow 21 described later is injected into the gas fuel inlet during operation on oil fuel. This purge air system may also be added to accomplish the present invention if such a system does not already exist.

Figure 3:
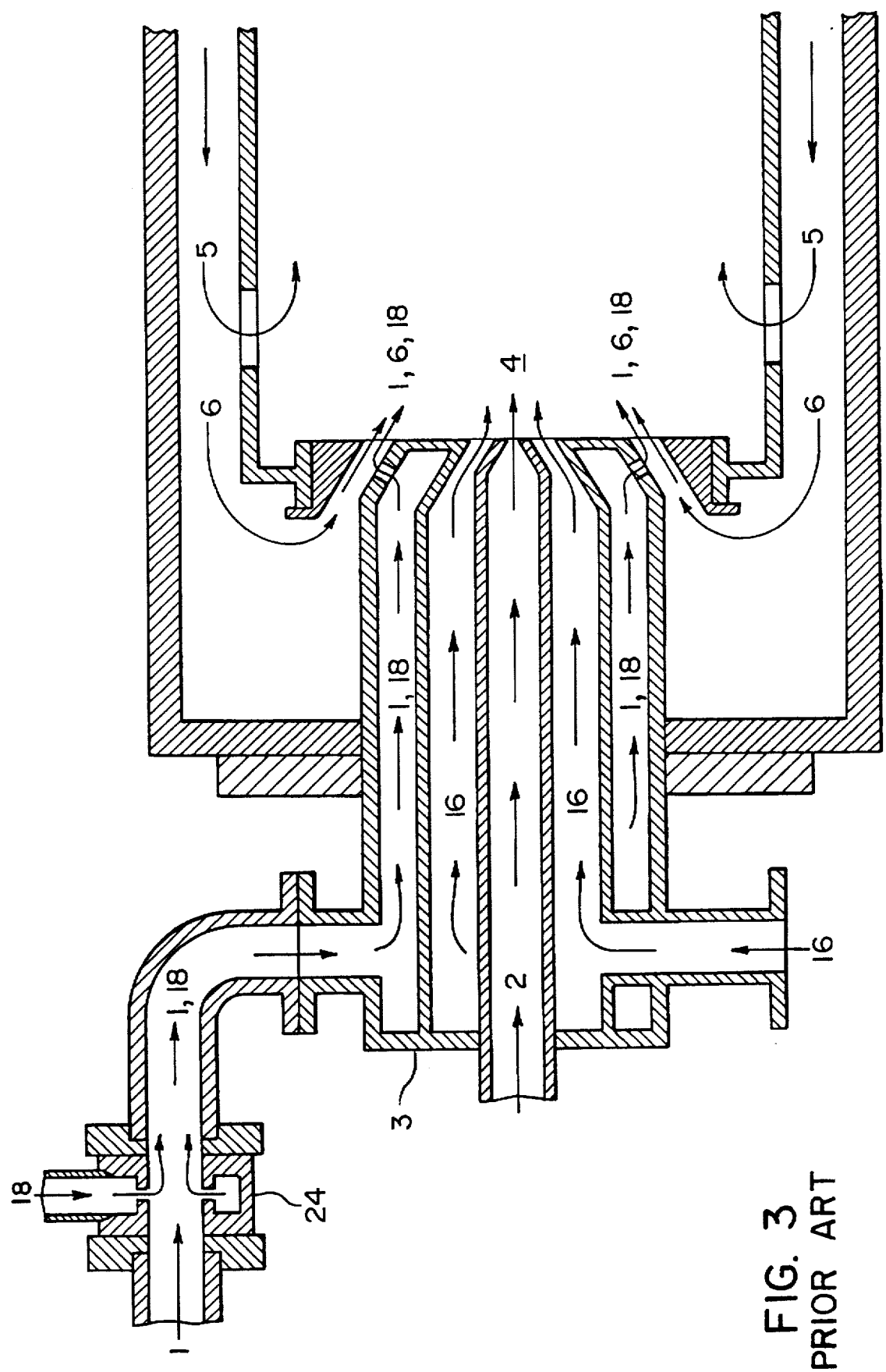
FIG. 3 shows a portion of the injection apparatus of FIG. 2, said portion modified so that the gas fuel stream carries water droplets into the combustion zone.

Referring to FIG. 3, Westinghouse engineers have designed means for adding water 18 to a gas fuel stream 1 by means of a water injection ring 24 located in the gas piping at the entrance to the fuel nozzle assembly 3 and allowing the gas fuel stream 1 to carry the water 18 into the combustion zone 4 along with compressor air 6. If the unit was equipped for dual fuel operation, oil fuel 2, and atomizing air 16 would also be included. The process had the expected result of reducing NOX emissions and also reduced deleterious effects of water on the system's hardware. This process was limited to gas fuel operation only and another system was necessary for water injection during operation on oil fuel.

Figure 4:
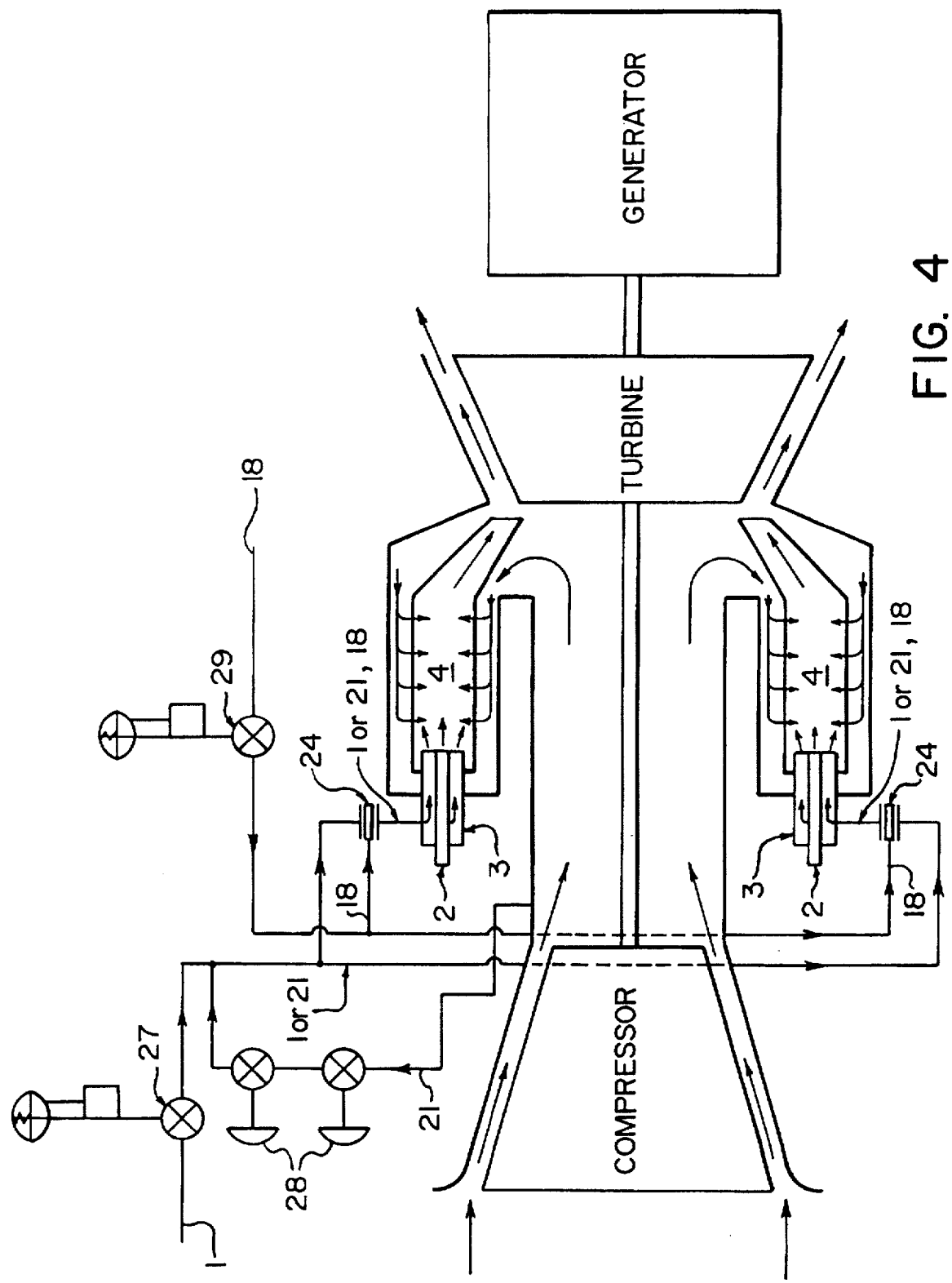
FIG. 4 shows the present invention. The purge air system rather than the gas fuel flow is used to transport water into the combustion zone when the turbine is operating on oil fuel.

Referring to FIG. 4, the present invention provides means for adding water 18 to the combustion zone 4 during oil fuel operation of a gas turbine equipped for dual (gas and/or oil) fuel. This means uses the purge air 21, already included in or which may be added to the system on dual fuel designs to carry the water 18 into the combustion zone 4.

This purge air system was incorporated into these designs to prevent a cross flow of hot gases between adjacent combustion zones through the gas manifold when operating on oil fuel.

When the system is operating by burning oil fuel to the exclusion of gas fuels, the gas flow control valve 27 is closed preventing the throughflow of gas.

Purge valves 28 are opened to pressurize the gas delivery system with air coming from the main gas turbine compressor. This purge air 21 flows through a portion of the gas system and exits into the combustion zone 4 in the same manner as the gas fuel 1 when the turbine is being operated on gas. The flow of purge air 21 out of the gas nozzles into the combustion zone 4 prevents the back flow of combustion gases into the gas system while the turbine is being fueled only by oil fuel.

During oil fuel 2 operation this invention uses this purge air flow 21 to carry the water 18, into the combustion zone 4 through the gas fuel portion of the fuel nozzle assembly 3 in the same manner as the gas fuel 1 enters the combustion zone when gas is the fuel being used. This eliminates the necessity of changing the main fuel nozzle assemblies to models of the type shown in FIG. 2 which include the water injection nozzles 19, thereby effecting a considerable saving in cost when adding water injection systems to dual fueled units not originally equipped with the water injection nozzles.

In this mode of operation the water control valve 29, is opened and acts to control the flow of water to the water injection rings 24, in the same manner as with operation on gas fuel.

EXAMPLE

The General Electric MS 7001B gas turbine is a is a design about 20 years old. Turbines of this or a similar age often have been modified and partially rebuilt, for example, a single fuel oil design may be retrofitted to have a dual fuel, gas/oil capacity. Such systems may already have installed a water injection system to provide water to combustion by addition of water to the instreaming gas fuel. Such a water injection system adds approximately 10% to the peak power capacity of a generating system fueled by gas.

As installed, the water injection system preferably has a water storage tank, an injection skid, for example a 100 HP, 130 gallon/minute, 600 psi pump, at least one filter, valves, meters and an injection control system, preferably a control system installed in a digital computer. These and other components can be recruited by practicing the present invention for use in a system for injecting water into combustion when the system is oil fueled.

The complete control system including valves, meters and feedback means and permissive logic, including water flow parameters based on a computed fuel flow and a water/fuel ratio, either operator selected or stored in the system, operates to monitor water and fuel flow, and to modulate at least a water control valve to maintain the water flow, as monitored by at least one meter, equal to the desired or required flow.

In such a retrofitted water injection system the gas fuel is provided as a stream and the stream of gas carries the injected water into combustion. The water is preferably injected into the gas stream as the stream enters each fuel nozzle. As such the system provides no capacity for injecting water when the turbine is operated using oil fuel, since there is no gas stream present to carry the injected water.

In the preferred embodiment of the present invention, the purge air system which flows through a portion of the gas fueling path is recruited to transport water to a combustion zone. Most preferably, a purge air system, a water injection system and a control system are recruited to provide water injection when the turbine is operating using oil fuel. Less preferably, at least one of valves, tanks, flowpaths, meters or the like is required to be installed to provide water injection to an oil fired turbine. The valves, meters and feedback controls are then coordinated using a control system, preferably a digital control system which functions to open air control valves to provide purge air when appropriate to a system fueled with oil, open water injection valves to allow water to flow into the purge air pathway, modulate at least one of the air and water control valves to provide an appropriate water boost and purge flow and continually adjust at least one flow to maintain proper flows under different or varying fuel conditions, different or varying fuel flow conditions, different or varying cycling conditions, for example, start-up, shut down or peak output demands, or operator inputted or emission monitor inputted parameters.

While the invention has been described with reference to particular preferred embodiments, the invention is not limited by these embodiments to the particular examples described, and other embodiments and modifications can be made by one skilled in the art without departing from the spirit and scope of the invention.

What is claimed is:

1. A process for reducing NOX emissions and/or increasing power output from a dual fuel turbine when said turbine is operating on oil fuel comprising:

using said turbine including a set of dual fuel injection nozzles for delivering oil fuel to a combustion zone, a purge air flow system including means for flowing purge air through plural gas fuel portions of the dual fuel injection nozzles when the turbine is being operated on oil fuel; and supplying a controlled flow of water via at least a section of said gas fuel portions of the dual fuel injection nozzle to the combustion zone during operation of the gas turbine on oil fuel, said water transported to said combustion zone by said purge air flowing therethrough.

2. A process for reducing NOX emissions and/or increasing power output in a dual fuel turbine when said dual fuel turbine is operating on fuel oil, said dual fuel turbine equipped with an air flow portion that flows fuel gas to a combustion zone, said fuel gas for fueling the turbine when said dual fuel turbine is operating on said fuel gas, and that flows purge air to said combustion zone when said dual fuel turbine is operating on oil, said process comprising:

supplying a controlled flow of water to said combustion zone during operation of the dual fuel turbine on oil fuel; and transporting, by flow of said purge air, water to said combustion zone through said air flow portion of a dual fuel injection nozzle.

3. A process for reducing NOX and/or increasing power output from a dual fuel turbine comprising:

supplying water to a purge air circuit; and flowing purge air through fuel gas nozzles of said purge air circuit said purge air carrying a controlled flow of water for delivery to a combustion zone of said dual fuel turbine thereby effecting at least one result selected from the group of results consisting of reducing NOX emissions and increasing power output from said turbine.

4. The process according to claim 1, further comprising installing said purge air flow system to supply said purge air and said controlled flow of water to said combustion zone.

5. The process according to claim 3, further comprising installing said purge air flow circuit to carry said purge air and said controlled flow of water to said combustion zone.

6. A dual fuel turbine equipped for using oil or gas, said turbine comprising:

a combustion zone;

a gas fuel portion of a fuel nozzle assembly for delivering fuel gas to said combustion zone; and a purge air circuit for flowing purge air through said gas fuel portion when said gas fuel portion is not supplying said fuel gas to said turbine;

said purge air circuit connecting to a water supply when said purge air is flowing through said gas fuel portion, and water from said water supply being controllably carried by said purge air to said combustion zone.

\* \* \* \* \*